Oct. 10, 1939.  C. D. PETERSON  2,175,911
SYNCHRONIZING CLUTCH
Filed Dec. 7, 1938
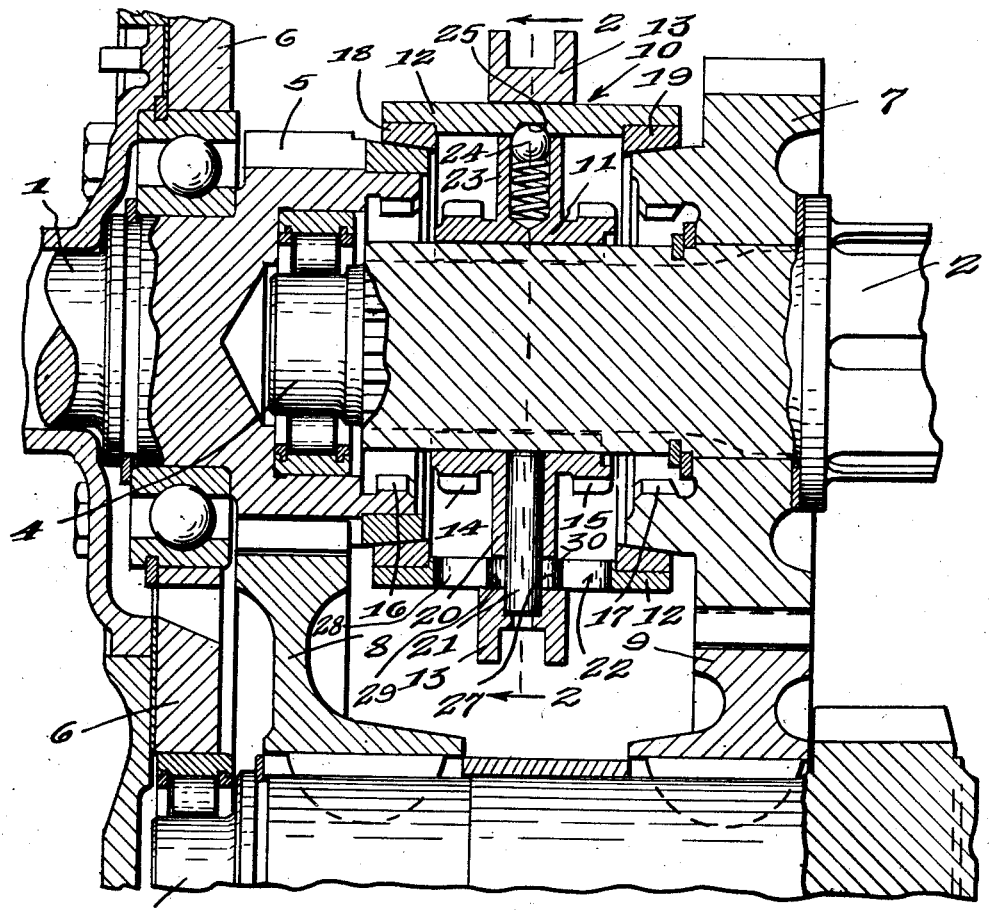
Fig-1-
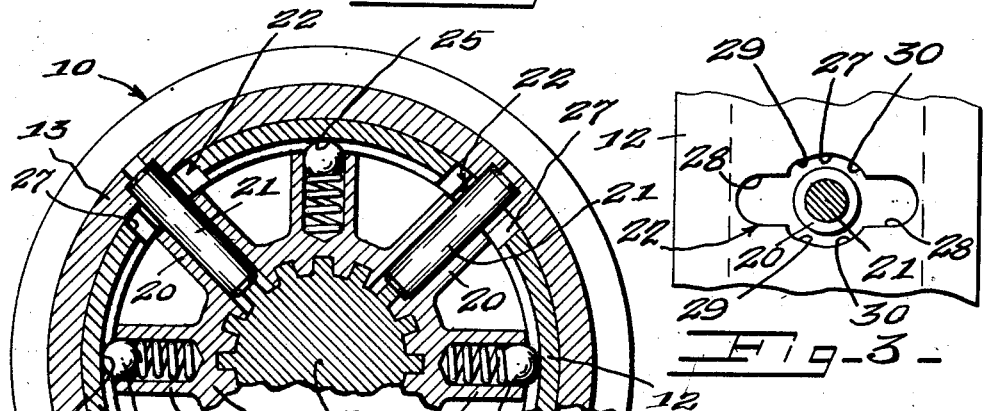
Fig-2-  Fig-3-
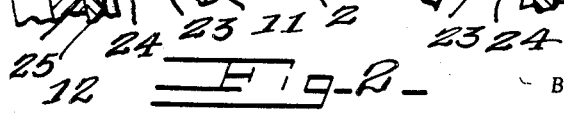
INVENTOR.
Carl D. Peterson
BY Bradell & Thompson
ATTORNEYS Patented Oct. 10, 1939

2,175,911

UNITED STATES PATENT OFFICE 2,175,911

SYNCHRONIZING CLUTCH

Carl D. Peterson, Toledo, Ohio

Application December 7, 1938, Serial No. 244,445

3 Claims. (Cl. 192—53)

This invention relates to synchronizing clutches for change-speed transmission gearings, such as are used in motor vehicles, and has for its object a synchronizing mechanism by which a greater pressure can be applied to the friction section of the clutch preliminarily to the clutch engagement of the toothed section, when the clutch is being shifted to establish a drive through one gear ratio than when the clutch is being shifted to establish a drive through another gear ratio. For instance, greater pressure originating in the shifting lever is applied to the friction section of the clutch preliminarily to the clutching of one of the toothed faces of the clutch when a shift is being made to establish a drive through a reduction gearing, as second speed forward, than when the shift is being made to establish direct drive, or first speed forward, the additional pressure effecting complete synchronization as quickly through the reduction gearing as through the higher ratio or direct drive.

The invention consists in the novel features and in the combinations and constructions hereinafter set forth and claimed.

In describing this invention, reference is had to the accompanying drawing in which like characters designate corresponding parts in all the views.

Figure 1 is a fragmentary sectional detail view of a transmission gearing embodying this synchronizing clutch.

Figure 2 is a fragmentary sectional view on the plane of line 2—2, Figure 1.

Figure 3 is a fragmentary view of the sleeve or friction section showing the construction of the synchronizing slot.

In the drawing, 1 designates the drive shaft; 2 the transmission shaft, and 3 the counter shaft of a change-speed transmission gearing, the shafts 1, 2 being mounted in axial alinement and the shaft 2 having a pilot bearing at 4 in the shaft 1 or in the gear 5 on said shaft. The shaft 1 and gear 5 are usually a unitary structure or a stem gear. These shafts are journalled in suitable bearings in the end walls of the gear box 6.

7 is a gear mounted on and normally rotatable about the transmission shaft 2 and forming part of a train of gears constituting an indirect drive between the shaft 1 and the shaft 2. This train of gears, in addition to the gears 5 and 7, includes gears 8 and 9 mounted on and rotatable with the counter shaft and meshing respectively with the gears 5 and 7.

10 designates generally the synchronizing clutch. This includes an inner section 11 mounted on the shaft 2 between the gears 5 and 7 and connected to the shaft 2 to rotate therewith, an outer friction section 12 surrounding the toothed section and a shifting collar 13 surrounding the friction section 12. The clutch 10 is shiftable in opposite directions from neutral to connect the shaft 2 with the shaft 1 through different gear ratios, it being shiftable to the left (Figure 2) to establish direct drive relation between shafts 1, 2 and to the right to establish an indirect drive through reduction gearing 5, 8, 9 and 7. The inner section 11 is formed with toothed clutch faces 14 and 15 on opposite sides thereof for coacting with clutch faces 16 and 17 on the gear 5 and the gear 7 respectively. The friction section 12 is in the form of a sleeve having truncated conical friction faces 18 and 19 at its opposite ends for coacting with complemental friction faces on the gears 5 and 7. As is well understood, the friction section coacts with the friction faces of the gears 5 and 7 in advance of the engagement of the toothed faces 14 and 15 or the toothed faces 16 and 17.

The inner section is shown as formed with radially extending posts 20 having pins 21 seated therein which extend through slots 22 in the sleeve 12 and into the collar 13 and establish a connection between the collar 13 and the toothed section 11. The inner section 11 is also formed with posts 23 alternating with the posts 20 and carrying spring-pressed poppets 24 which coact with cam-shaped notches 25 in the sleeve 12 and serve to yieldingly transmit axial shifting movement of the inner section 11 to the friction section 12 to engage the friction faces in advance of the toothed faces.

The construction of the synchronizing clutch per se thus far described forms the subject matter of my pending application, Serial No. 219,421, filed July 15, 1938.

This invention relates to means by which greater pressure may be applied to the sleeve 12 through the collar 13 to apply a greater force to the friction section when the shift is being made, as to the right (Figure 1) to establish indirect drive, than when the shift is being made to the left to establish direct drive. This means comprises the slot 22 which extends lengthwise of the sleeve and has a wider intermediate portion 27, the walls of which are of such form as to offer greater obstruction to the pin or pins 21 when the shift is being made in one direction than in the other, and hence to press one friction face harder than the other friction face, to prevent clashing of the toothed faces that would otherwise occur due to premature engagement of the toothed or jaw faces before synchronization is completed. The pin 21, which is normally arranged in the wider portion 27, is of less width than the wider portion and is movable into the narrower end portions 28 of the slot, when a shift is made in one direction or the other from neutral and slidably fits the narrower end portion. When the clutch 10 is shifted in one direction or the other to bring the friction face 18 or 19 into clutching engagement with the complemental friction face of the gear 5 or gear 7, further shifting is blocked by the portions of the walls of the wider portion 27 where they approach the narrower portions 28 until the speeds are synchronized.

When the shift is being made to establish the high gear or direct drive ratio, the synchronizing is effected quicker and with less pressure on the friction section 12 than when the shift is made to establish the indirect drive through the train of gears. This is due to the greater centrifugal effect of the rotating parts on the gear 7 than on the gear 5 or shaft 1. Hence, the walls 29 of the wider portion where they approach the left hand narrow portion 28 of the slot 22 is at a small incline compared with that of the portion 30, where it approaches the other end portion 28 of the slot 22 into which the pin 21 passes when clutching the gear 7 to the shaft 2, or, in other words, the portion 30 offers a greater obstruction to shifting than the portion 29, so that the operator applies more pressure to the shifting lever, and hence to the collar 13, toothed section 11 and through the pin 21 to the sleeve 12, causing increased friction to effect the synchronizing between the sleeve 12 and the gear 7. This greater pressure required brings about a quick synchronization through the friction face 19.

In operation, during shifting of the clutch 10 to the left, the pin is blocked by the small incline 29 until synchronization occurs, and the shift completed without applying heavy pressure to the sleeve 12. When the shift is made to the right, the pin is blocked by the more abrupt inclines 30 and the greater pressure thereagainst, naturally applied by the operator to complete the gear shift, causes the friction clutch at 19 to more tightly engage the friction face of the gear 12, which is rotating under greater inertia, and quickly effect synchronization.

What I claim is:

1. In a double synchronizing clutch operable in opposite directions from neutral to establish drives through different gear ratios in a change-speed transmission gearing, said clutch comprising a toothed clutch section rotatable with a shaft of the gearing and shiftable axially thereof in opposite directions from neutral and having toothed faces on opposite sides thereof for coacting with toothed faces of gears to be alternately clutched to the shaft, and a friction section having friction faces on opposite sides thereof for alternately coacting with friction faces on the gears to be alternately clutched to the shaft in advance of the clutching engagement of the toothed section, a shifting collar encircling the friction section and slidable axially thereon, and connected to the inner section to shift the same, means for yieldingly transmitting the motion of the toothed section to the friction section, and a synchronizing connection between the friction section and the toothed section comprising means for positively applying shifting pressure from the toothed to the friction sections preliminarily to the clutching engagement of the toothed section, said connection embodying means for applying greater shifting pressure to the friction section from the toothed section preliminarily to clutching engagement of the toothed section, when the toothed section is shifted in one direction than when the clutch section is shifted into the other direction from neutral.

2. In a double synchronizing clutch operable in opposite directions from neutral to establish drives through different gear ratios in a change-speed transmission gearing, said clutch comprising an inner toothed section rotatable with a shaft of the gearing and shiftable axially thereof in opposite directions from neutral and having toothed faces on opposite sides thereof for coacting with toothed faces of elements to be clutched alternately to the shaft and a friction section including a sleeve encircling the toothed section and having friction faces at its opposite ends for alternately coacting with friction faces on the elements to be alternately clutched to the shaft in advance of the clutching engagement of the toothed section, a shifting collar encircling the sleeve and slidable axially thereon and connected to the inner section to shift the same, and means for initially yieldingly transmitting the motion of the toothed section to the friction section to engage one or the other of the friction faces preliminary to the clutching engagement of the toothed section, the sleeve being formed with a lengthwise slot having a wider intermediate portion, and a collar being connected to the toothed section by posts extending through the slot of less width than the intermediate wider portion of the slot and normally arranged therein, and slidably fitting the end portions of the slot, the posts coacting with the walls of the wider portion of the slot where they approach the narrower portion to block shifting of the toothed section until the speeds are synchronized through the friction section, the walls on one side of the wider portion where they approach one end portion of the slot being of a greater incline than the corresponding walls at the other side of the wider portion.

3. In a double synchronizing clutch including an inner toothed section having clutch teeth on opposite sides thereof, an outer friction synchronizing section having friction clutch faces on opposite sides thereof, shifting means connected to the inner section, and yielding means between the sections for initially transmitting the shifting movement of the inner section to the outer section, the inner section having a radial projection, and the friction section having a slot through which the projection extends, the slot including end portions, and an intermediate portion of greater width than the end portions, the projection slidably fitting the end portions and being of less width than the intermediate portion, the walls of said intermediate portion where they approach the end portions being of different inclinations out of planes at a right angle to the direction of movement of the projection into the slot for the purpose set forth.

CARL D. PETERSON.